Aug. 22, 1950  J. W. SPEAKER  2,519,984
CLAMP FOR USE IN VULCANIZING
Filed Aug. 23, 1946  5 Sheets-Sheet 1

Inventor
John W. Speaker

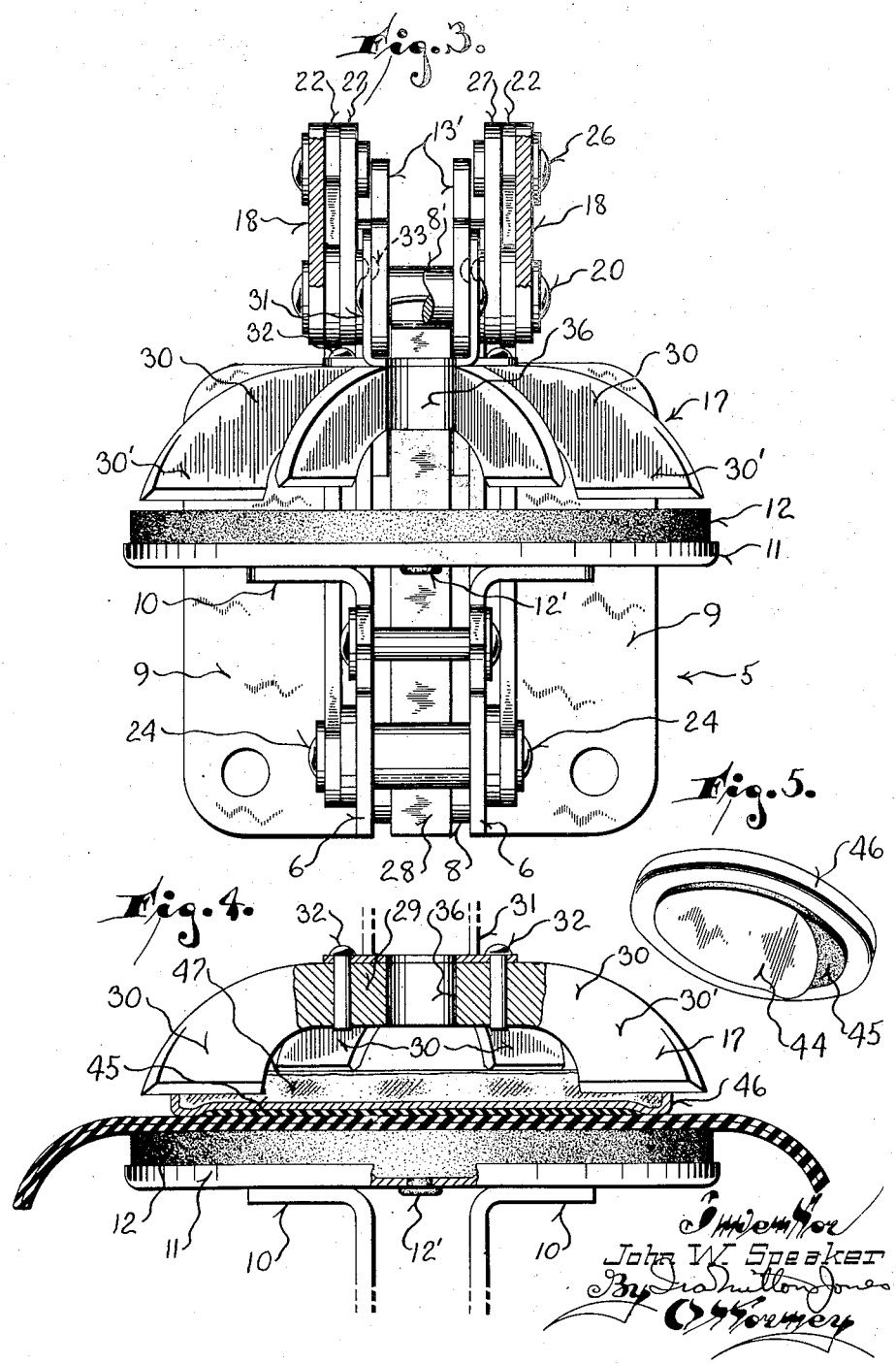

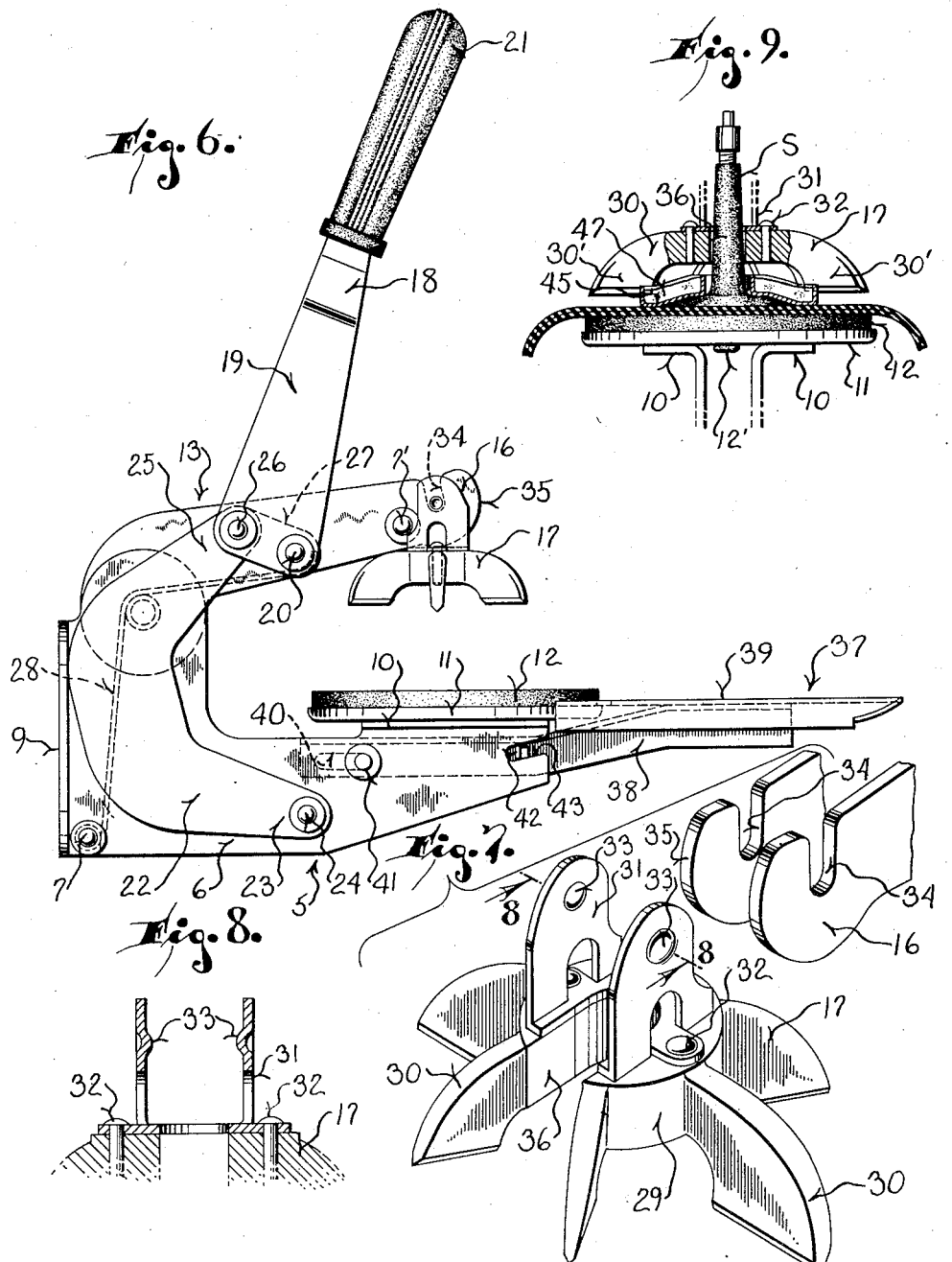

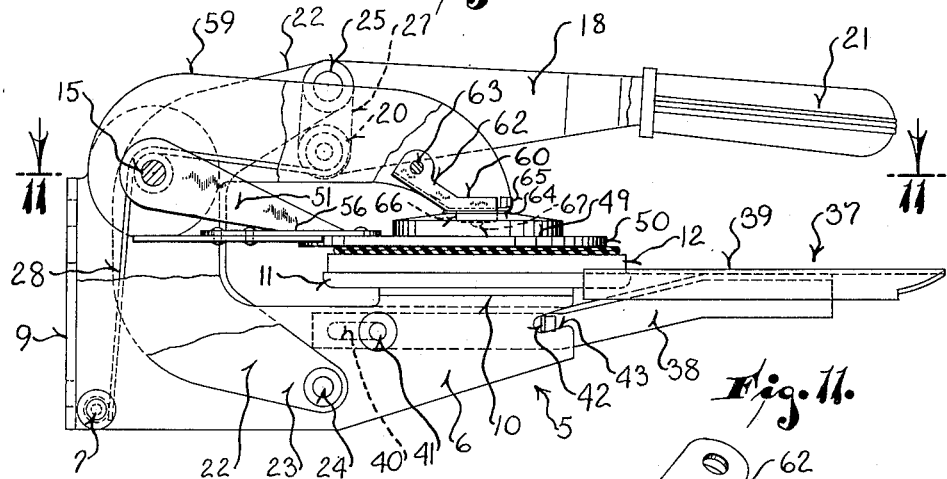
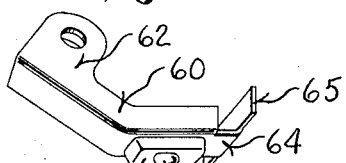
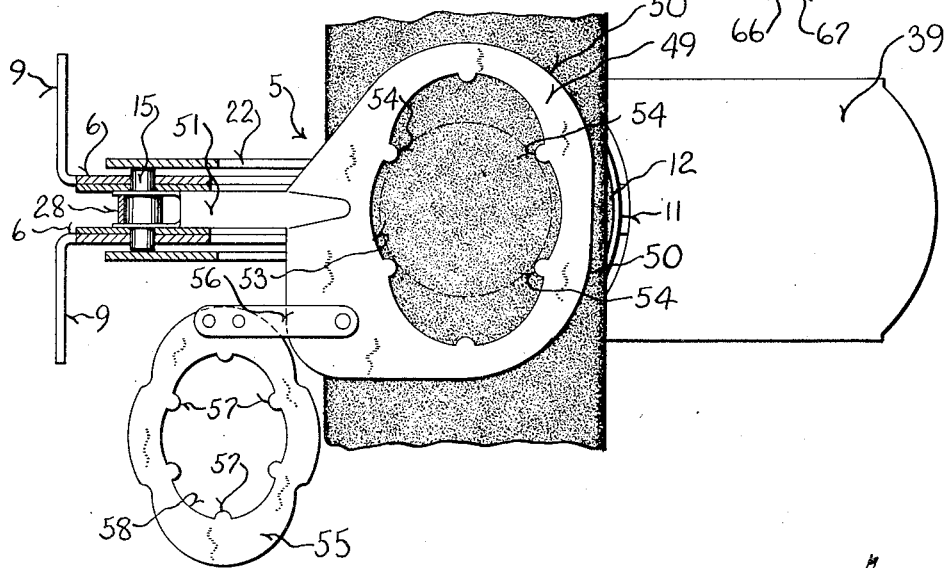

Aug. 22, 1950   J. W. SPEAKER   2,519,984
CLAMP FOR USE IN VULCANIZING
Filed Aug. 23, 1946   5 Sheets-Sheet 5
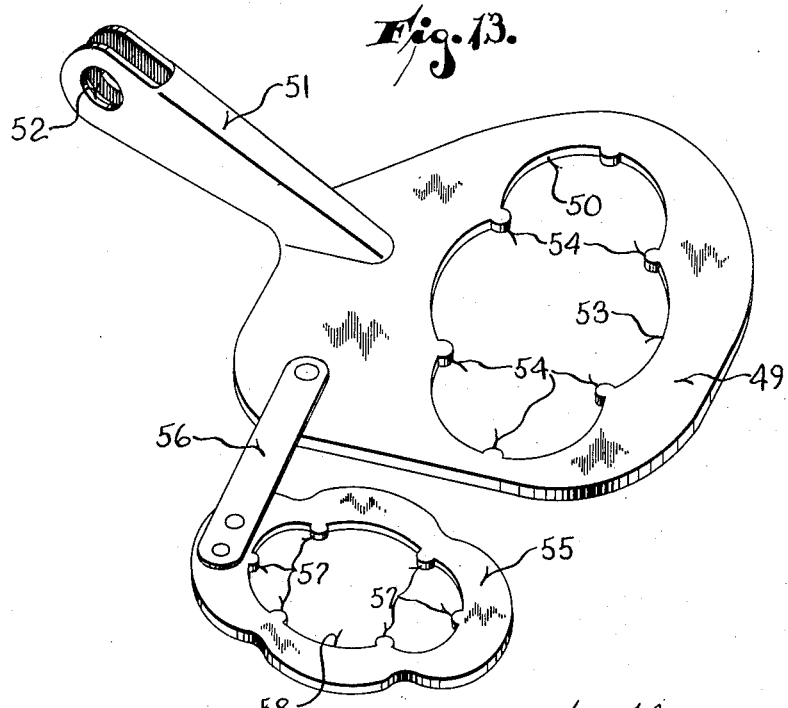
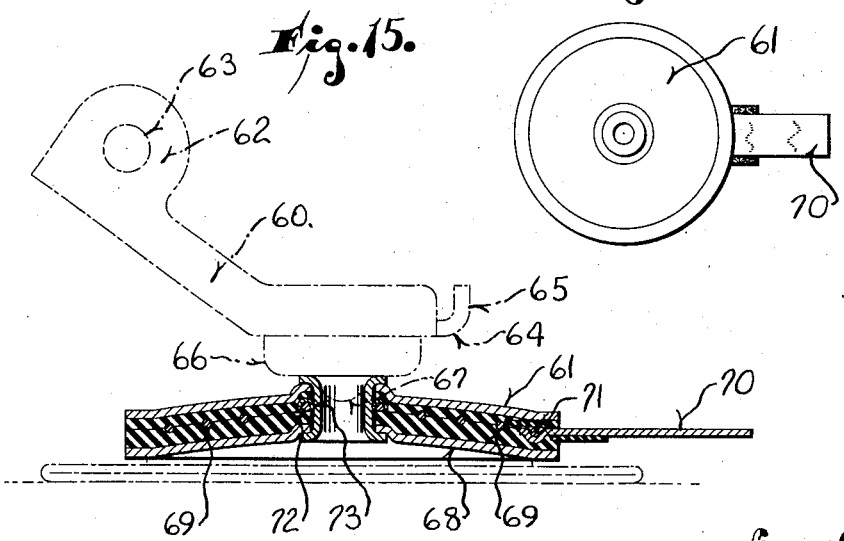
Inventor
John W. Speaker Patented Aug. 22, 1950

2,519,984

UNITED STATES PATENT OFFICE 2,519,984

CLAMP FOR USE IN VULCANIZING

John W. Speaker, Milwaukee, Wis.

Application August 23, 1946, Serial No. 692,663

11 Claims. (Cl. 18—18)

This invention relates to an improved clamp for use in vulcanizing patches to inner tubes and other rubber articles.

To insure proper vulcanization of a repair patch onto an inner tube or other rubber article, it is important not only to supply the correct degree of heat to the repair patch during the vulcanizing process, but also to apply the proper amount of pressure to the patch and the article being repaired.

In the past it has been customary to employ for this purpose a screw type clamp in which the pressure applied to the patch and rubber article being repaired is obtained by turning a screw shaft in a direction to close the clamp. The amount of pressure applied to the patch in a device of this character will, of course, depend entirely upon the operator's judgment and strength.

The vulcanizing pressure applied by the old screw type clamp is thus indeterminate, and will vary from patch to patch, so that repair jobs produced by it are non-uniform and not completely dependable. The screw type vulcanizing clamp, moreover, is slow, cumbersome and inconvenient to operate, and does not readily adapt itself to use with vulcanizing patches of different sizes.

The device of this invention, by contrast, provides a clamp which will automatically produce the proper amount of vulcanizing pressure without requiring the operator to exercise any degree of skill or judgment. Moreover, it eliminates the necessity for turning a screw through a large number of revolutions in both the clamping and unclamping operations, providing instead a clamp which may be closed or opened by a single movement of a lever.

It is therefore an object of this invention to provide a vulcanizing clamp for use in the repair of rubber articles which is extremely simple to operate and which will consistently apply a predetermined amount of pressure to articles placed therein for vulcanizing.

Another object of this invention resides in the provision of a vulcanizing clamp which may be moved to the closed position or to the open position by a single movement of a lever.

Another object of this invention resides in the provision of a compact and efficient clamp of the character described which may be successfully operated by inexperienced personnel.

Another object of this invention resides in the provision of a vulcanizing clamp of the character described which may be inexpensively constructed, largely from metal stampings.

Another object of this invention resides in the provision of a vulcanizing clamp which has an unusually large throat, to accommodate large articles for repair, and which is sufficiently sturdy to withstand the stress resulting from the necessary pressures applied thereby.

Another object of this invention is to provide a vulcanizing clamp of the character described incorporating a tube last which may be readily swung to an operative position for use as a table upon which an inner tube may be stretched and buffed preparatory to vulcanization or swung to an inoperative position where it will be completely out of the way.

Another object of this invention resides in the provision of a vulcanizing clamp which may be readily adapted to the application of replacement valves as well as patches of different sizes.

Another object of this invention is to provide a clamp of the character described having means for holding a patch against accidental displacement during closure of the clamp.

Still another object of this invention is to provide a clamp which is equally suitable for use with the so-called match patches in which the heat for vulcanization is obtained by the ignition and burning of a combustible substance contained within a shallow metal pan to the bottom of which the repair patch is adhered, and the so called electric patches which incorporate an electrical heating element.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is an end view, partly in section, taken along the line 3—3 in Figure 2;

Figure 4 is a sectional view taken generally on the plane of the line 4—4 in Figure 2, showing the pressure spider and table with an inner tube and repair patch clamped between them for vulcanization;

Figure 5 is a perspective view of a match type vulcanizing repair patch which is one of the types of patches for which the vulcanizing clamp of this invention is adapted;

Figure 6 is a side view of the clamp of this invention in fully open position;

Figure 7 is a detail perspective view showing a pressure spider and the end of the pressure arm to which different spiders are detachably securable.

Figure 8 is a detail sectional view taken on the plane of the line 8—8 in Figure 7;

Figure 9 is a sectional view similar to Figure 4, but illustrating the manner in which replacement valves are clamped to the inner tube for vulcanization;

Figure 10 is a side view of the clamp, but illustrating the same adapted for use with electrically heated patches and equipped with a patch centering guide;

Figure 11 is a perspective view of the pressure shoe especially adapted for the application of pressure to the electrically heated patches;

Figure 12 is a horizontal sectional view through Figure 10 on the plane of the line 11—11;

Figure 13 is a perspective view of the patch centering guide detached from the clamp;

Figure 14 is a top plan view of an electrically heated patch; and

Figure 15 is a cross sectional view through the patch shown in Figure 14.

Figure 1:
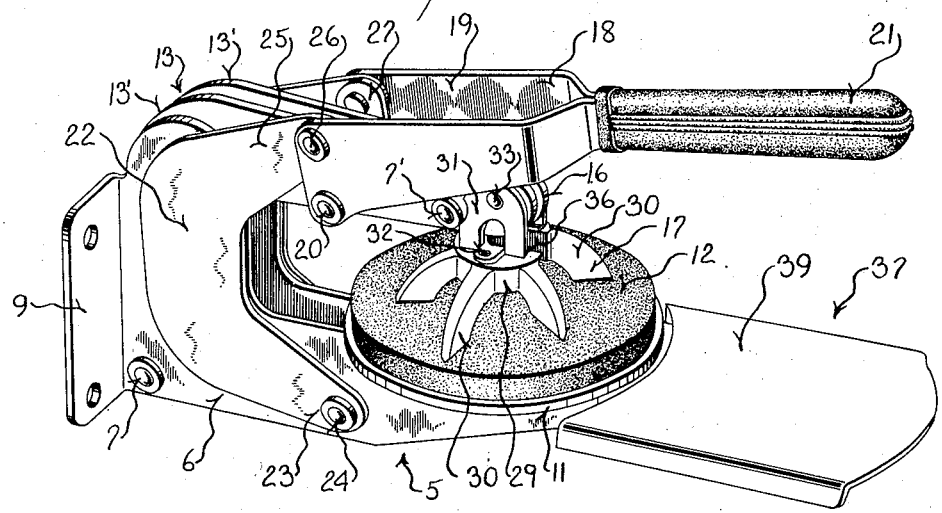
Figure 1 is a perspective view of the vulcanizing clamp of this invention.

Referring now to the accompanying drawings, in which like numerals designate like parts throughout the several views, the numeral 5 designates generally the base member of the vulcanizing clamp of this invention. This base member comprises a pair of flat substantially L-shaped stampings 6, secured together in spaced apart relationship, parallel to one another, by means of rivets 7 and spacers 8. A bracket or flange 9, bent outwardly at right angles to the rear portion of each L-shaped stamping, provides means for mounting the clamp to a wall or post.

The front ends of the forwardly projecting arms of the L-shaped base members 6 have horizontal flanges 10 directed laterally therefrom and these flanges have a circular tray-like table 11 secured thereto. A pad 12 of rubber or other resilient material rests upon the top surface of this table where it is held by one or more knobbed teats 12' integral with the pad and received in appropriately dimensioned holes in the table. This pad serves as a cushion under the article being repaired and provides uniform pressure distribution over its entire surface as will be hereinafter more fully explained.

The base member 5 together with the table 11 at the front end thereof and the pad 12 resting thereon provide a lower fixed jaw for the clamp. The upper jaw, which is movable, consists essentially of a pressure arm 13 pivotally connected to the base as at 14. The pressure arm 13 is fabricated from a pair of identical flat stampings 13' which like the stampings 6 that comprise the base member 5, are secured in spaced apart relationship, parallel to one another, by means of rivets 7' and spacers 8'. The width of the pressure arm 13, however, is less than the distance between the inner surfaces of the stampings 6 which comprise the base member 5 so that the pressure arm fits between the stampings 6.

The pivot 14 is conveniently formed by a cross pin 15 connecting the stampings 6 of the base and passing through the rear end of the arm 13, a spacer 8' being mounted on the pin to hold the adjacent sides of the arm properly spaced.

The length of the pressure arm is such that its front end 16 overlies substantially the center of the pad 12 towards and from which it is movable as the arm is swung about its pivot 14. Thus a spider-like pressure applying member 17 secured to the front end 16 of the pressure arm 13 will be centered over the pad 12.

A bifurcated handle member or operating lever 18 also preferably formed as a stamping, provides means for quickly swinging the pressure arm up and down about its pivot 14. The forked portion 19 of the handle member straddles the medial portion of the pressure arm and is pivoted thereto by a pin or rivet 20 equipped with a spacer bushing 8'. The handle portion of the operating lever is preferably provided with a resilient covering or grip 21 to enable the operator to grasp the same comfortably.

A pair of identical substantially C-shaped stampings 22 is connected between the handle member and the base, in such a way as to form a toggle through which great leverage for actuating the pressure arm is obtained. The lower end 23 of each of the toggle arms is secured to the medial portion of the base by means of pivot pins or rivets 24, one toggle arm overlying each side of the base member, with its surfaces adjacent and parallel to those of the base member.

The upper end 25 of each toggle arm 22 is pivotally secured to the forked rear end of the handle member 18 by means of pins or rivets 26. The axis of the pins 26 is spaced from and is parallel to the axis of the pin 20 which secures the handle member 18 to the pressure arm 13, and these axes are so located with respect to each other that when the handle is in a horizontal position, the former axis will lie directly above the latter. Thus, when the handle member 18 is swung downwardly from a raised to a horizontal position, the upper ends 25 of the toggle arms 22 will be swung forwardly, and since the distance between the upper and lower ends of the toggle arms remains substantially constant, the displacement toward vertical of the line joining the axes of the pins 26 and 20 forces the front end of the pressure arm 13 downward to exert clamping force.

It should be noted, however, that the C-shaped stampings 22 have a certain degree of resiliency and thus yield during the application of clamping force. This resiliency is utilized in a manner to be hereinafter described to assure proper pressure upon the work regardless of the inevitable variations in the thickness thereof.

When the axis of the pins 20 is on "dead center," that is, when the axis of the pins 20 coincides with the plane common to the axes of the pins 24 and 26, the pressure arm is in its lowermost position where it may be effectively locked against upward displacement due to pressure on its free end, by allowing the axis of the pins 20 to move just slightly cross dead center. To stop the handle at a position at which the toggle is thus "locked," the inner edge of the upper portion of each toggle arm 22 engages a washer 20' on the pin 20, at the point X (see Figure 2).

It is preferable to connect a toggle link 27 between the pin 20 and each pin 26 on either side of the pressure arm adjacent to the inner surface of the toggle arms, to counterbalance the downward tension force upon the outer ends of the pins 26 when the handle member is brought downward against great pressures, thus preventing these pins from binding or shearing as a result of such forces.

A substantially right angularly shaped leaf spring 28 is provided to bias the pressure arm 13 to its raised or open position. The medial portion of this spring is fulcrumed on the pivot pin 15 while one end bears against the underside of the pin 20 and its other end bears against the lowermost rivet 7 on the base. The spring is prevented from raising the pressure arm excessively by the fact that the rear edge of the upper portion of each toggle arm 22 is permitted only a limited rearward movement, since it strikes the front surface of the mounting flange 9 as shown in Figure 6.

The spider or pressure member 17 may be fabricated in any of several forms and sizes, to accommodate any of the several types of "hot patches" which may be used in vulcanizing work. In general, however, the spider comprises a body or hub portion 29 having a plurality of integral legs 30 extending downwardly and radially outwardly therefrom.

A substantially U-shaped stamping 31 is secured to the top of the body or hub portion by means of rivets 32. The arms of this stamping embrace the end of the pressure arm when the spider is attached thereto. Dimples 33 are struck inwardly from the arms of the stamping for engagement with mating vertical slots 34 at the front of the pressure arm stampings. The front edge 35 of the pressure arm stampings is formed as an arc struck from the bottom of the slot 34 at its center. The radius of this arc is equal to the distance between the top of the body portion of the spider 29 and the center of the dimples 33, so that the spider may be readily attached to the end of the pressure arm by tilting it at right angles to its normal position, with the legs 30 pointing forward, inserting the dimples into the slot until they bottom therein, and then allowing the spider to rotate about the dimples to assume its normal position.

It will thus be seen that the spider will readily adjust itself to align horizontally with the surface of the pad 12, regardless of the angular position of the pressure arm. Moreover, since the arcuate edge 35 of the pressure arm is always in contact with the top of the body portion 29 of the spider, movement and pressure of the pressure arm will be transmitted directly to the spider.

To accommodate the stem S of replacement valves, the body or hub portion 29 of the spider may be provided with a slot 36 opening toward the front thereof (see Figure 7). The valve stem S extends upwardly through this slot and into the space between the stampings 13' which comprise the pressure arm 13, as shown in Figure 9. In practice, two or more different spiders are furnished with each clamp, and since the spiders may be quickly installed and removed from the pressure arm, it will be seen that the clamp of this invention, provides unusual versatility, since it may be instantly adapted for use with any type of repair patch.

A tube last 37 provides a convenient platform across which an inner tube may be stretched for buffing preparatory to vulcanization. The tube last consists of a channel shaped arm 38 with an arched table 39 secured to its outer portion. Both of these parts may be readily fabricated as sheet metal stampings and spot welded together.

A horizontal slot 40 through each side of the channeled arm, near its inner end, receives a pin 41 which is secured in the bottom portion of the stampings 6 which form the base member 5. A lug 42, struck outwardly from each channel side, is receivable in a slightly angled, substantially horizontal slot 43 in the front of each base member stamping 6.

Figure 2:
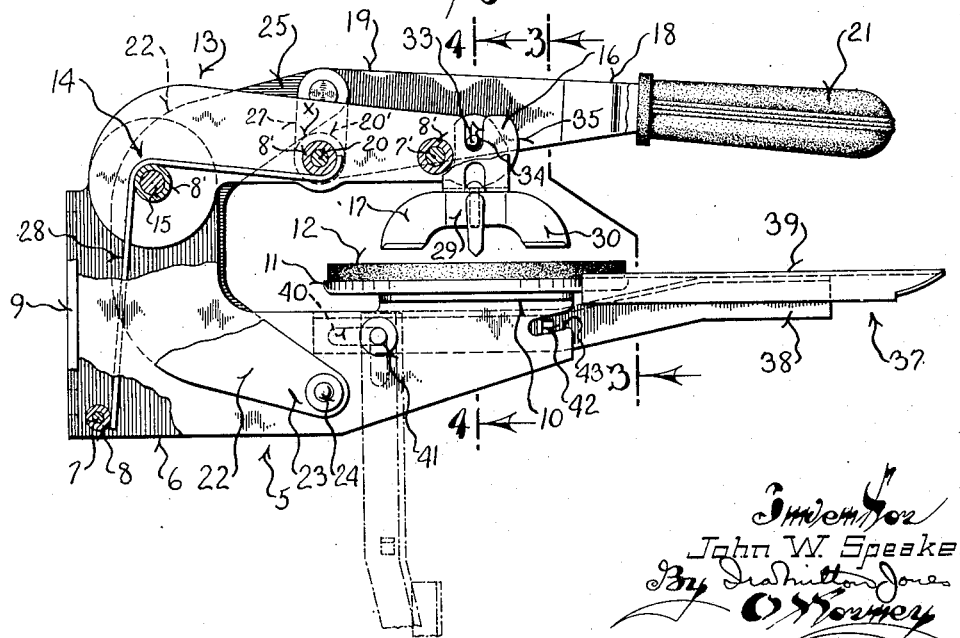
Figure 2 is a side view of the vulcanizing clamp in the closed position, parts thereof being broken away and in section.

When not in use, the tube last may be allowed to hang vertically from the pin 41, as shown by dotted lines in Figure 2. To bring it to an operative position, the table 39 is swung to a substantially horizontal position and pulled outwardly to allow the lugs 42 to enter the slots 43. A slight rearward push then bottoms the lugs 42 at the rear of the slots 43 to secure the last in a horizontal position. The last may be readily dropped out of the way again by pulling it slightly forward to disengage the lugs 42 from the slots 43.

In using the clamp of this invention the surface of the inner tube or other rubber article to which the patch is to be applied is first roughened, and the tube is then laid across the resilient pad 12. The protective fabric 44 is peeled off the surface of a "hot patch" 45 of appropriate size and shape (see Figure 5) and this is then placed upon the tube with the rubber patch downward. A spider of the proper type is installed at the front of the pressure arm, and by moving the handle downwardly the spider is brought to bear upon the rim of the metal pan 46 to which the patch is temporarily attached, and which contains a combustible material 47. Two of the legs 30' of the spider extend downwardly somewhat farther than the rest, and these engage in V-shaped notches in the rim of the pan to insure proper centering thereof. With the clamp fully closed, the combustible material 47 is ignited, the burning of which provides the necessary heat to effect vulcanization of the patch to the tube. The handle may then be raised to release the tube, and the repair is completed.

A properly installed patch has a tapering or "feathered" edge. This is assured in the clamp of this invention by the conjoint action of the resilience of the pad 12 and the resilience of the bottom of the metal pan 46 which flattens the edges thereof as shown in Figure 4. The pad 12 also provides an insulating barrier to prevent dissipation of the heat generated during the vulcanizing process.

Since the pressure arm is automatically stopped within a certain distance of the surface of the pad 12, the same pressure will always be applied to patches notwithstanding variations in size and shape. Variations in the thickness of the rubber in inner tubes are compensated for by the resilience of the pad and by the fact that the toggle arms have a certain amount of inherent resilience or spring which permits the ends of the toggle arms to open slightly in case the total thickness of the article being repaired and the vulcanizing patch exceeds the total thickness for which the clamp is preset.

With the clamp of this invention it is easier to manually hold the patch in its proper position during closure of the clamp than with the old screw type clamp. However, greater facility in this respect is afforded by the patch centering guide shown in Figures 10, 11 and 12. As more particularly shown in Figure 12, this guide consists of a flat plate 49 stamped from sheet metal and provided with a marginal stiffening flange 50.

An arm 51, preferably integral with the stamped plate, extends angularly therefrom to provide means for attaching the guide to the clamp. This arm has a U-shaped cross section and its side flanges have holes 52 to receive the pivot pin 15. Thus, the guide plate like the pressure arm may be swung up and down from and towards the pad 12. In its lowermost position, it lies flat against the top of the inner tube or other article being patched, and a hole 53 in the guide plate exposes the prepared surface of the tube around the tear or break therein. Thus the edges of the hole 53, and specifically the inward projections 54 on its marginal edge, provide a guide to properly center the patch over the tear or break and also hold the same centered with respect to the pressure applying spider inasmuch as the guide plate is held in proper relation thereto by its attaching arm 51.

The shape of the hole 53 is such that the projections 54 will accommodate large sized oval patches as well as round patches. For smaller patches, an insert guide 55 is provided. This guide is pivoted to the plate 49 by a spring arm 56 enabling the same to be swung into and out of a position aligned with the hole 53. When so positioned the outer edges of the small guide 55 fit within the projections 54, and similar projections 57 on the edges of a hole 58 in the plate 55 serve to center the patches.

Obviously the clamp may be used with or without the centering guide.

Similarly the clamp may be used with electrically heated patches as well as the "match patches" hereinbefore described. When electrically heated patches are to be used, a pressure arm 59 of slightly modified construction is employed (Figure 10). This arm is mounted and actuated in the same way as the arm 13 and is also formed of two identical stampings, but its front end has a pressure shoe 60 attached thereto to provide for the application of pressure to the center of an electric heater unit 61.

The shoe 60 is a stamping with side flanges 62 fitting between the sides of the pressure arm and pivoted thereto as at 63. The bottom of the shoe has a horizontal fore part 64, the front edge of which is turned up and provided with sideward projections 65 which bear against the lower front edges of the arm 59. This manner of connecting the shoe to the arm precludes setting up objectionable stresses in the side plates of the arm 59.

An oval shaped boss 66 projects downwardly from the bottom wall 64 of the shoe to engage in a correspondingly shaped opening in the larger oval shaped heater units, and a round dimple 67 projects down from the bottom of the boss 66 to engage in the central hole of small round heater units.

The heater units themselves may be of any suitable design and construction, but should have a concave underside 68 and, of course, a heating element 69 from one end of which a terminal 70 projects. The other end of the heating element is connected to the metal shell of the unit so as to be grounded to the frame of the clamp during use. The heating element is thus readily connected in an energizing circuit by merely attaching one lead 71 to the terminal 70 and connecting the other lead 72 to a terminal 73 on the base of the clamp.

From the foregoing description, taken in connection with the accompanying drawings, it will be readily apparent that this invention provides an improved vulcanizing clamp which has many advantages over clamps heretofore available for this purpose particularly because of its simple operation and assurance of automatically applying the proper amount of vulcanizing pressure to articles placed therein for repair.

What I claim as my invention is:

1. A vulcanizing clamp comprising: a pair of clamping jaw members; a hinge connection between said jaw members constraining the same to relative opening and closing movement about the axis of the hinge connection; said jaw members being adapted to press a vulcanizable patch to an article to be repaired upon closure of said clamping jaw members with such article and patch in position therebetween; and means including a toggle for releasably locking said clamping jaws in predetermined relative positions of closure, one element of said toggle being resiliently yieldable under closing pressure of said clamping jaws to thereby compensate for variations in the combined thickness of the article to be repaired and the patch.

2. A clamp for use in vulcanizing patches to inner tubes and the like, comprising: a pair of jaws; a hinged connection between said jaws constraining the same to relative opening and closing movement about the axis of the hinged connection; a table on one of said jaws normal to the direction of opening and closing movement of the jaws; a resilient pad on said table; pressure applying means on the other jaw cooperable with the pad; an operating lever hingedly connected to one of said jaws for swinging movemovement with respect thereto about an axis parallel to the axis of the hinged connection between the jaws; a link pivotally connected to the other jaw and to the operating lever at a distance from the hinged connection between the operating lever and the jaw to which it is connected whereby said link and part of the operating lever constitute a toggle adapted to translate movement of the operating lever into closure and opening of the jaws; stop means for limiting movement of the toggle connection at a point slightly beyond dead center to thereby hold the jaws closed with the pressure applying means in a predetermined position with respect to the pad to effect proper vulcanizing pressure on a vulcanizing patch and an article to be repaired interposed between said pressure applying means and the pad; and said link being resiliently yieldable during closure of the jaws to cooperate with the resilient pad and automatically compensate for variations in the combined thickness of the article to be repaired and the vulcanizable patch.

3. In a vulcanizing clamp of the character described, including a movable jaw member, a pressure member adapted to be readily removably attached to the movable jaw member, comprising: a spider having a body portion and a plurality of downwardly angled legs extending radially therefrom; a pair of parallel spaced arms extending up from the top of said spider; and lugs on the sides of said arms adapted to be removably received in a slot extending downwardly from the top of the movable jaw member at the end thereof, and forming trunnions about which said pressure member may pivot so that the legs thereof will be pointed downwardly in any position of the movable jaw member.

4. In a vulcanizing clamp of the character described: a movable pressure arm comprising a pair of substantially flat side members secured in spaced apart relationship, with their surfaces parallel to the direction of motion of said pressure arm; a spider adapted to be secured to said pressure arm and comprising a body portion and a plurality of legs extending downwardly and radially outwardly therefrom, said body portion having a slot therein to accommodate the stem of a replacement tire valve which extends upwardly into the space between the side members of said pressure arm during application of the replacement tire valve to an inner tube held in the clamp; and cooperating means on the end of said pressure arm and on said spider for removably and hingedly securing said spider to said pressure arm.

5. In a vulcanizing clamp of the character described: a movable pressure arm having a slot through its pressure exerting end parallel to the direction of its pressure exerting motion; a pressure spider adapted to be secured to said pressure arm and comprising a body portion and a plurality of legs extending downwardly and radially outwardly therefrom, said body portion having a slot therethrough to accommodate the stem of a replacement tire valve which may extend upwardly therethrough and into the slot in the pressure arm; and cooperating means on said pressure arm and said spider for removably and hingedly securing said spider to said pressure arm with said two slots substantially in alignment with one another.

6. A clamp for use in vulcanizing patches to inner tubes and the like, comprising: a base member having a bracket attachable to a vertical support and a forwardly projecting arm; a horizontal table secured to the top of said arm; a resilient pad on said table; a pressure arm hingedly connected to the base member rearwardly of the table and extending forwardly over the arm of the base member with its free end movable up and down toward and from the surface of said resilient pad; a pressure applying member removably and pivotally secured to the free end of said pressure arm to face said resilient pad; an operating handle pivotally connected at its inner end to the medial portion of said pressure arm; and a substantially C shaped toggle arm pivotally connected at one end to the base member and having its other end pivotally connected to said operating handle at a point thereon spaced from the point of connection of said operating handle to said pressure arm, the axes of said two pivotal connections to the operating handle being parallel to one another and lying in a plane substantially normal to the length of the operating handle so that downward movement of the free end of said operating handle moves the free end of the pressure arm downward to enable the pressure applying member to cooperate with said resilient pad in applying pressure to an inner tube and vulcanizable patch interposed between the two.

7. A clamp for use in vulcanizing patches to inner tubes and the like, comprising: complementary hingedly connected upper and lower jaws; a table secured to the lower jaw with its top facing the upper jaw; pressure applying means on the upper jaw and above the table so that upon closure of the jaws a patch may be pressed to an inner tube portion on the said table; an operating lever pivotally connected at one end to the upper jaw with its free end swingable in the plane of movement of the jaws; and a toggle link pivotally connected at one end to the lower jaw and at its other end to the operating lever at a point spaced from the point of connection of said operating lever to said upper jaw, with the axes of said pivotal connections parallel to one another, the point of connection of said toggle link to said lever lying above the point of connection of said operating lever to said upper jaw when said operating lever is in a predetermined position so that movement of said operating lever to said predetermined position closes the jaws and releasably holds them closed.

8. A clamp for use in vulcanizing patches to inner tubes and the like, comprising: a base having opposed side plates provided by a pair of substantially similar stampings secured together in spaced apart parallel relationship; a table secured across and connecting the top of the side plates at the front end thereof; a pressure arm comprising a pair of stampings secured together in spaced apart parallel relationship, said arm being of a width to fit between the side plates of the base; means hingedly connecting the rear end of the pressure arm to and between the side plates of the base with the hinge axis normal to said side plates of the base so that the pressure arm is swingable in a plane parallel to and between said side plates and toward and from said table; pressure applying means on the pressure arm above the table; a handle member; means hingedly connecting the handle member to the medial portion of said pressure arm to swing about an axis parallel to the hinged axis of the pressure arm; a pair of toggle links, each comprising a flat substantially C-shaped stamping; means pivotally connecting the lower end of each of said toggle links to one side plate of the base with the surfaces of said toggle links parallel to the side plates and overlying the outer faces thereof; means pivotally connecting the upper ends of said toggle links to the handle member, the open throat of the C-shaped stampings providing the toggle links facing forwardly, the pivotal axis of said connection between the upper ends of the toggle links and the handle member being spaced from and parallel to the axis of the hinged connection between the handle member and the pressure arm, and being so located with respect thereto that said connection between the handle member and the toggle links is above the connection between the handle member and the pressure arm when said arm is swung to a predetermined position, so that movement of said handle member to said predetermined position places the toggle links in tension and forces the free end of said pressure arm downwardly toward said table to exert vulcanizing pressure upon a vulcanizing patch and an inner tube inserted between the pressure applying means and the table; and stop means for limiting such motion of the handle member, toggle links and pressure arm at a point where all of said pivotal connections lie substantially in a common plane, and the pressure arm is releasably held in a predetermined pressure applying position.

9. A clamp for use in vulcanizing patches to inner tubes and the like, comprising: complementary members providing jaw members for the clamp; a hinge connection between said jaw members constraining the same to relative opening and closing movement about the axis of the hinge connection; means on said jaw members adapted to receive therebetween a patch and an inner tube or other article to be repaired; a toggle linkage connecting the jaw members and adapted to force said members together to close the clamp as the toggle linkage is actuated toward dead center and to releasably hold the clamp closed, one element of said toggle linkage being resilient and therefore yieldable during closure of the clamp so as to automatically compensate for differences in the combined thickness of the patch and inner tube or other article being repaired; and handle means connected with the toggle linkage for actuating the same to open and close the clamp.

10. The clamp described in claim 9 further characterized by the fact that the handle means is fixed to and extends from one of the elements of the toggle linkage.

11. The clamp described in claim 9 further characterized by the fact that one element of the toggle linkage comprises a C-shaped stamping having a degree of inherent resiliency so that the ends of the C may be resiliently spread apart, and that the connection between the other element of the toggle linkage and the jaw member to which it is connected lies between the ends of the C-shaped stamping so that closure of the clamp imposes a force upon the C-shaped stamping tending to spread apart the ends thereof.

JOHN W. SPEAKER.

REFERENCES CITED

The following references are of record in the file of this patent:

UNITED STATES PATENTS

| Number | Name | Date |
|---|---|---|
| 2,099,499 | Raney | Nov. 16, 1937 |
| 2,126,767 | Gibbons | Aug. 16, 1938 |
| 2,163,377 | Hanson | June 20, 1939 |
| 2,193,514 | Kendall | Mar. 12, 1940 |
| 2,272,965 | Crowley | Feb. 10, 1942 |
| 2,296,162 | Hanson et al. | Sept. 15, 1942 |
| 2,356,858 | Laurence | Aug. 29, 1944 |

FOREIGN PATENTS

| Number | Country | Date |
|---|---|---|
| 3,180 | Great Britain | Feb. 9, 1910 |